(12) United States Patent
Tisse et al.

(10) Patent No.: US 7,031,539 B2
(45) Date of Patent: Apr. 18, 2006

(54) CODING OF CONCENTRIC INFORMATION

(75) Inventors: Christel-Loic Tisse, Plan de Cuques (FR); Damien Barbeyrac, Luynes (FR)

(73) Assignee: STMicroelectronics S.A., Montrouge (FR)

(*) Notice: Subject to any disclaimer, the term of this patent is extended or adjusted under 35 U.S.C. 154(b) by 633 days.

(21) Appl. No.: 10/273,792

(22) Filed: Oct. 18, 2002

(65) Prior Publication Data
US 2003/0076984 A1    Apr. 24, 2003

(30) Foreign Application Priority Data
Oct. 19, 2001 (FR) .................................. 01 13522

(51) Int. Cl.
*G06K 9/36* (2006.01)
(52) U.S. Cl. .................. 382/243; 382/232; 382/248
(58) Field of Classification Search ................ 382/232, 382/248, 243; 359/599, 9, 25, 15; 355/67; 322/39; 327/3, 261; 377/43
See application file for complete search history.

(56) References Cited

U.S. PATENT DOCUMENTS 5,128,624 A * 7/1992 Hoshino et al. ............... 327/3
5,289,135 A * 2/1994 Hoshino et al. ............... 327/3
5,568,071 A * 10/1996 Hoshino et al. ............. 377/43

FOREIGN PATENT DOCUMENTS

JP         408082643         * 3/1996

OTHER PUBLICATIONS

Cumming et al., "Digital Processor of SEASAT SAR Data", IEEE vol. 4, Apr. 1979, pps. 710-718.*
French Search Report from French Patent Application No. 01/13522, filed Oct. 19, 2001.
Daugman J. "High Confidence Recognition of Persons By Rapid Video Analysis of Iris Texture" ECOS European Convention on Security and Detection, May 16, 1995, pp. 244-251.

(Continued)

*Primary Examiner*—Anh Hong Do
(74) *Attorney, Agent, or Firm*—Lisa K. Jorgenson; William R. McClellan; Wolf, Greenfield & Sacks, P.C.

(57) ABSTRACT

A method for coding in frequency, module and phase a digital representation, in the space field, of a ring-shaped element, including the steps of: applying to any point of the element a polar conversion at constant angle, whereby the element is unfolded in rectangular form; transferring, to the frequency field, any point of the converted rectangular shape by means of a Fourier transform; filtering the discrete data resulting from the transfer by means of at least one real, bidimensional, band-pass filter, oriented along the phase axis; applying a Hilbert transform to the filtering results; applying an inverse Fourier transform to the results of the Hilbert transform; and extracting phase and module information in the space field.

10 Claims, 2 Drawing Sheets

OTHER PUBLICATIONS

Havlicek J.P. et al. "The Analytic Image" Image Processing, 1997. Proceedings, International Conference on Santa Barbara, CA USA Oct. 26-29, 1997, Los Alamitos, CA, USA, IEEE Comput. Soc, US, Oct. 26, 1997, pp. 446-449.

Bingham C., et al. "Modern Techniques of Power Spectrum Estimation" IEEE Trans. On Audio and Electronics, ' en ligne! vol. AU-15, No. 2, Jun. 1967, pp. 55-66.

"Windowing Method" Matlab Documentation—Image Processing Toolbox, 'en ligne! Mar. 8, 2001, p. 1.

Graham J.R. "Windowing and the DFT" Fourier Transforms & The Frequency Domain, 'en ligne! Feb. 22, 2001, pp. 1-3.

* cited by examiner

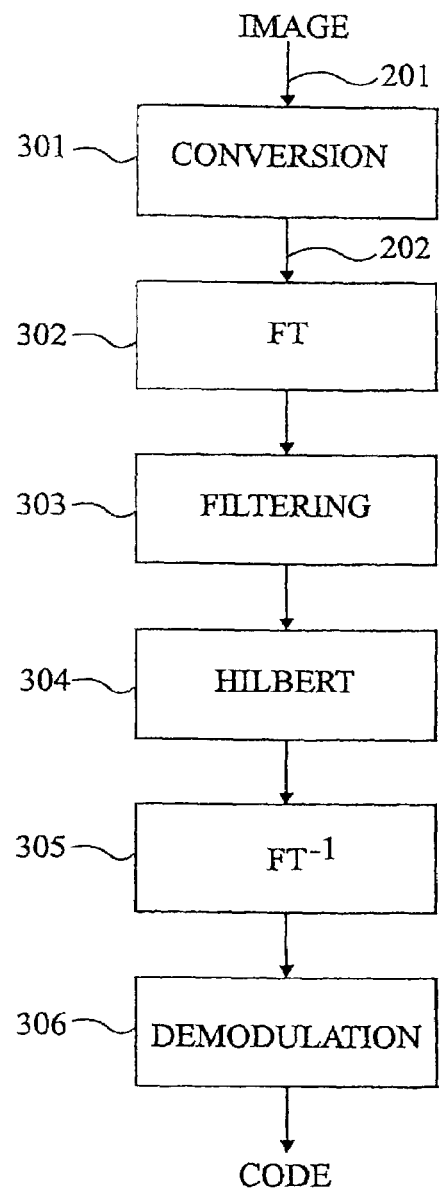
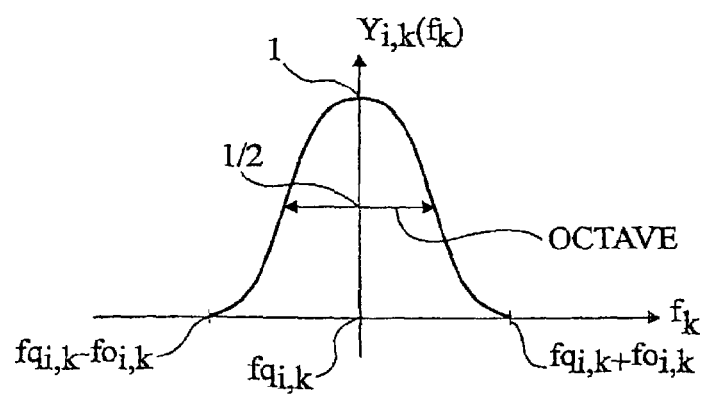
Fig 3
Fig 4

CODING OF CONCENTRIC INFORMATION

BACKGROUND OF THE INVENTION

1. Field of the Invention

The present invention relates to a method for coding a ring-shaped element of a digital image. More specifically, the present invention relates to a method for coding such an element in which the "useful" information is ring-shaped or circular, that is, where the information to be coded varies according to the angular position in concentric circles.

2. Discussion of the Related Art

An example of application of the present invention is the coding of the iris of an eye in a digital image in a recognition process. On the one hand, the iris of an eye is a ring-shaped element delimited by the cornea and by the pupil. On the other hand, an iris is characterized by its texture, which is a set of three-dimensional patterns of bumps and holes, each pattern having in the iris a radial direction. Such a texture translates, upon digital two-dimensional acquisition, as the alternation of light and dark areas. The texture variation in the iris from the pupil edge to the cornea along a radial direction is very small. The information characteristic of the iris texture varies according to the angular position on concentric circles.

To enable relatively fast iris recognition, rather than comparing point by point a processed image with reference images, various methods for extracting its texture have been provided.

A first known method consists, as discussed in U.S. Pat No. 5,572,596 and in international patent application 00/62239, both of which are incorporated herein by reference, of decomposing the texture of the digital image into wavelets. In practice, this decomposition in wavelets or sub-strips is implemented by means of filtering cells applied on the space coordinates of the image and chosen to isolate low frequencies from high frequencies. After each filtering, a decimation (or sub-sampling by two) is performed, thus limiting the calculation complexity without losing information. However, this type of sub-strip coding imposes use of a large memory storage to keep the significant information of the texture of the digital image.

FIG. 1 schematically illustrates, in the form of a block diagram, another known method for coding an iris, which consists of performing a local spectral decomposition by a set of band-pass filters, generally Gabor filters.

A digital image of an eye IMAGE, in which the iris to be coded has previously been localized, is considered. First, at block 101 (CONVERSION), the general ring-shape of the iris is transformed in straight rectangular form. This is done by converting the Cartesian coordinates of the iris into polar coordinates, by means of a constant angle polar conversion.

FIG. 2A schematically illustrates an iridian ring 201, delimited by a pupillary circle P and by the circular limit I between the iris and the cornea. An intermediary circle C between limits I and P is considered. Circle C includes the information to be coded.

By conversion 101, iridian ring 201 is transformed into a rectangular image 202 illustrated in FIG. 2B, in which the data of circle C are now distributed on a line, for example, horizontal.

At the next step, at block 102 (GABOR), a number of lines of the image and a number of points in these lines is selected and a filtering is applied to the retained discrete values, generally the pixel intensity (levels of grey), by means of a Gabor filter (band-pass). The choice of the central frequencies of the strips and of the bandwidths is performed according to a compromise between the constraints of precision and significance of the information extracted from the filtering. Generally, to obtain reliable results, the points of each of the selected lines are filtered over three frequency fields. "Frequency" here means a relative frequency expressed in cycles per image, that is, which refers to the dimensions of the initial image. The extracted information thus does not depend on the digitizing conditions, which enables subsequent direct comparison between a processed image and a reference image.

The used Gabor filter is a complex filter. For each of the central frequencies of the filer, analog information as to the real and imaginary parts Re and Im of the filtering products is thus obtained after filtering. The D.C. component being eliminated by the filtering, the obtained information varies around the used reference. FIGS. 2C and 2D respectively illustrate an example of variation of real part Re and of imaginary part Im along time t on a portion of a line of the image.

At the next step 103 (BINAR), illustrated in FIGS. 2E and 2F, the preceding data Re and Im are transformed into binary data.

Then, at block 104 (CODING), the binary data are coded, taking the phase into account (the information being in the angular direction). The phase coding is possible due to the fact that the Gabor filter is a complex filter and that the real and imaginary portions of the filter are in quadrature. Indeed, this enables considering that the ratio of the real and imaginary parts Re and Im is equal to the tangent of the phase.

The codes thus obtained for each of the processed lines or points are then used for any appropriate processing, for example, a comparison with reference codes to enable an iris recognition. An example of a known method for coding the local phase is described in U.S. Pat. No. 5,291,560, which is incorporated herein by reference.

A disadvantage of a Gabor filter method is the fact that it requires many calculations during the filtering, due to the very nature of the used filters. Indeed, the size of the convolution cores with respect to the size of the image to be convoluted (even after the gaussian envelope characteristic of Gabor filters has been truncated) and the complex structure including a real part and an imaginary part, of the filters lengthen the calculation times.

Another disadvantage is that the accuracy of the obtained coding is directly linked to the number of calculations. Accordingly, if more information is desired to discriminate two images, the amount and time of calculation must be increased.

SUMMARY OF THE INVENTION

The present invention aims at providing a method for coding information with a circular distribution in a ring-shaped element, which is faster than known methods.

The present invention also aims at providing such a method which provides a coding containing more information and thus more reliable results than known methods, without increasing the amount of calculation.

The present invention also aims at providing such a method applicable to the coding of the iris of an eye in a digitized image.

The present invention further aims at providing a filter which enables coding information with a circular distribution in a ring-shaped element, which is simpler than currently-used filters. In particular, the present invention aims at providing such a filter which enables simply and rapidly obtaining a code in phase, frequency, and module.

To achieve these and other objects, the present invention provides a method for coding in frequency, module, and phase a digital representation, in the space field, of a ring-shaped element, including the steps of:

applying to any point of the element a polar conversion at constant angle, whereby the element is unfolded in rectangular form;

transferring, to the frequency field, any point of the converted rectangular shape by means of a Fourier transform;

filtering the discrete data resulting from the transfer by means of at least one real, bidimensional, band-pass filter, oriented along the phase axis;

applying a Hilbert transform to the filtering results;

applying an inverse Fourier transform to the results of the Hilbert transform; and extracting phase and module information in the space field.

According to an embodiment of the present invention, the real, bidimensional, band-pass filter oriented along the phase axis is the product of two one-dimensional Hamming windows, the transfer function of each of these windows being zero everywhere, except in a restricted frequency field around a central frequency in which its analytic expression is the following:

$$Y_{i,k}(f_k) = \alpha_{i,k} + (1 - \alpha_{i,k})\cos\frac{\pi(f_k - fq_{i,k})}{f0_{i,k}}, \text{ where}$$

i represents the index of the filter in a series (for example, three) of used filters;

k designates the direction of the considered Hamming window (k=1 or 2);

$f_k$ is the current frequency;

$\alpha_{1,k}$ is a non-zero real positive number strictly smaller than 1, called the shape coefficient;

$fq_{i,k}$ is the central frequency of the one-dimensional band-pass filter in direction k and of index i in the filter series; and $f0_{1,k}$ determines the spectrum spreading centered on frequency $fq_{i,k}$.

According to an embodiment of the present invention, the Hamming windows have identical coefficients $\alpha_{1,k}$.

According to an embodiment of the present invention, the Hamming windows are Hanning windows for which the identical coefficients $\alpha_{i,k}$ are 0.54.

According to an embodiment of the present invention, the Hamming windows have different coefficients $\alpha_{i,k}$.

According to an embodiment of the present invention, the real bidimensional band-pass filter oriented along the phase axis has a pass-band at −3 dB with a width of one octave.

According to an embodiment of the present invention, the pass-band of each of the Hamming windows is defined by:

$$f0_{i,k} = \frac{\pi}{3arcos\left(\frac{\frac{1}{2} - \alpha_{i,k}}{1 - \alpha_{i,k}}\right)} fq_{i,k},$$

where arcos designates the inverse cosine function.

According to an embodiment of the present invention, the method consists of applying three real bidimensional band-pass filters oriented along the axis of the characteristic information of the rectangular image, of different central frequencies.

The present invention also provides a method for coding, in a digital image, a texture of a ring-shaped element defined by the including of a first circle of relatively small radius in a second circle of relatively large radius, consisting of implementing the method of any of the preceding embodiments.

According to an embodiment of the present invention, the ring is the iris of an eye, the first circle being the pupil of said eye and the second circle being the limit between the iris and the eye cornea.

The foregoing objects, features and advantages of the present invention, will be discussed in detail in the following non-limiting description of specific embodiments in connection with the accompanying drawings.

BRIEF DESCRIPTION OF THE DRAWINGS

FIG. 3 illustrates in a flowchart the step sequence of an iris coding method according to an embodiment of the present invention; and FIG. 4 illustrates the transfer function of a filter according to an embodiment of the present invention.

DETAILED DESCRIPTION

For clarity, the same elements have been designated with same references in the different drawings. Further, FIGS. 2A to 2F are not drawn to scale.

A coding mode of an iris or any other ring-shaped element including a texture, that is, characteristic information varying more significantly on concentric circles than along radial directions, is described hereafter in relation with FIGS. 3 and 4.

Figure 1:
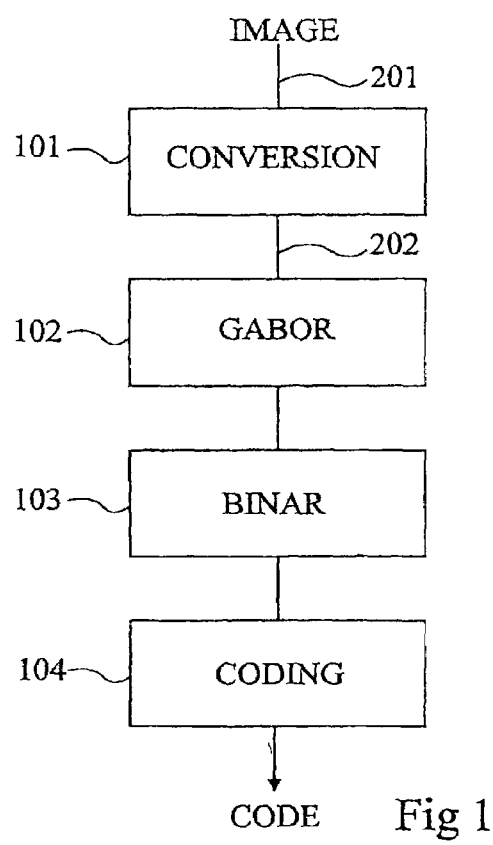
FIG. 1 illustrates in a flowchart the step sequence of a known iris coding method.
Figure 2A:
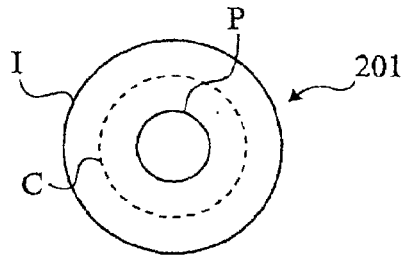
FIGS. 2A to 2F illustrate the implementation of some steps of the method of FIG. 1.

A digital image IMAGE to be processed includes a ring-shaped element to be coded, here, an iris, similar to that previously described in relation with FIG. 2A.

Figure 2B:
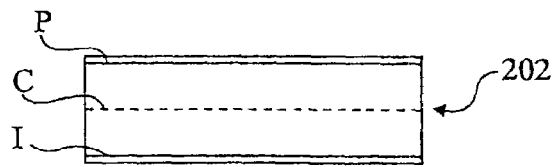
Figure 2C:
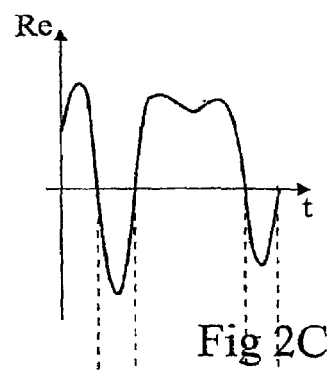
Figure 2D:
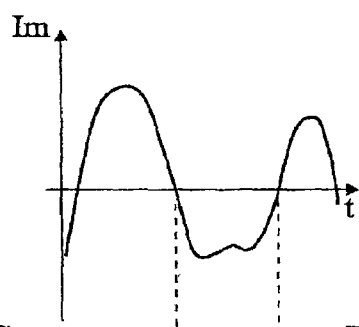
Figure 2E:
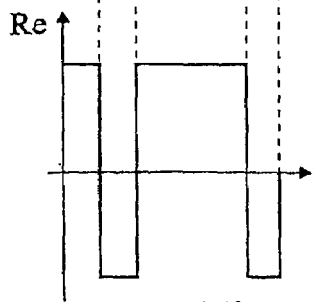
Figure 2F:
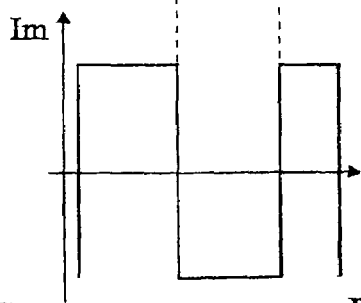

First, at block 301 (CONVERSION), the general ring shape of the iris is transformed into a rectangular shape 202 of FIG. 2B. This is done by converting the cartesian coordinates of the iris into polar coordinates, by means of a polar conversion at constant angle.

At the next step, at block 302 (FT), converted image 202 of FIG. 2B is transferred from the space field to the frequency field by a Fourier transform. A fast Fourier transform is generally used.

Then, at block 303 (FILTERING), the discrete values obtained by the Fourier transform are filtered by means of a real two-dimensional filter oriented in the direction of the characteristic information of the textured rectangular image.

According to a preferred embodiment of the present invention, a filter having its transfer function $X_i(f_1,f_2)$ resulting from the product of two Hamming windows $Y_{i,1}(f_1)$ and $Y_{1,2}(f_2)$ ($X_i(f_1,f_2)=Y_{i,1}(f_1) \cdot Y_{i,2}(f_2)$), where $f_1$ and $f_2$ designate the frequencies in both directions of the bidimensional filter. The transfer function $Y_{i,k}(f_k)$ of a Hamming window, illustrated in FIG. 4, is zero everywhere, except in a restricted frequency field around a central frequency in which its analytic expression is the following:

$$Y_{i,k}(f_k) = \alpha_{i,k} + (1 - \alpha_{i,k})\cos\frac{\pi(f_k - fq_{i,k})}{f0_{i,k}},$$

where i represents the filter index among a series (for example, three) of used filters;

k designates the direction of the considered Hamming window (k=1 or 2);

$f_k$ is the current frequency, ranging between $f_{qi,k}-f0_{i,k}$ and $fq_{1,k}+f0_{1,k}$;

$\alpha_{1,k}$ is a real non-zero positive number strictly smaller than 1, called the shape coefficient;

$fq_{1,k}$ is the central frequency of the one-dimensional band-pass filter in direction k and of index i in the filter series; and $f0_{1,k}$ determines the spectral spreading centered on frequency $fq_{1,k}$.

According to an embodiment, the two Hamming windows $Y_{1,1}$ and $Y_{1,2}$ of the bidimensional filter have identical shape coefficients $\alpha_{1,1}$ and $\alpha_{i,2}$. Preferably, the Hamming windows then are Hanning windows for which shape coefficient $\alpha_{1,k}$ is 0.54.

As an alternative, the two Hamming windows $Y_{1,1}$ and $Y_{1,2}$ of the bidimensional filters have shape coefficients $\alpha_{1,1}$ and $\alpha_{1,2}$ different from each other.

According to a specific embodiment of the present invention, in the case of identical shape coefficients $\alpha_k$, the filter has a pass-band at −3 dB having a width of one octave along both image directions (vertical and horizontal).

Then, in the preferred embodiment using the product of two Hanning windows, with the preceding notations, the pass-band at −3 dB of the filter of one octave is obtained if value $f0_{i,k}$ with respect to central frequency $fq_{1,k}$ is the following:

$$f0_{i,k} = \frac{\pi}{3arcos\left(\frac{\frac{1}{2} - \alpha_{i,k}}{1 - \alpha_{i,k}}\right)} fq_{i,k},$$

where arcos designates the inverse cosine function.

The bidirectional band-pass filter having a bandwidth of one octave at −3 dB thus obtained is preferably applied for several different central frequencies $fq_{1,k}$.

By choosing three central frequencies distributed to be separated by one octave (for example, 7, 14, and 28 cycles per image), the entire spectral field containing the information is covered. The three filters are separately applied to the rectangular iris image. Three result images are obtained.

At the next step, at block 304 (HILBERT), a Hilbert transform is applied to the results of the preceding filterings. A complete extension or discrete analytic image is then obtained, in accordance with the teachings of article "The analytic Image" by J. P Havlicek et al., IEEE 1997, pages 446–449, and as detailed in work "Handbook of image and video processing" by A. Bovic, published in 2000, which is incorporated herein by reference.

Then, an inverse Fourier transform of the analytic image is applied at block 305 ($FT^{-1}$) to return to the space field.

For each pass-band of the frequency field, that is, around each central frequency $fq_{1,k}$, the module, instantaneous phase and emergent frequency information, respectively $a_i(x_0,y_0)$, $\phi_i(x_0,y_0)$, and $\Delta\phi_1(x_0,y_0)$ are then extracted, at block 306 (DEMODULATION), in the space field, by means of standard demodulation methods. Such methods are described for example in "Discrete quasi eigenfunction approximation for AM-FM image analysis" by J. P Havlicek et al., IEEE 1996, pages 633–636 or in "The multi-component AM-FM image representation" by J. P Havlicek et al., IEEE transactions on image processing, June 1996, pages 1094–1096, both of which are incorporated herein by reference.

Although the method according to the present invention seems to be longer and more difficult to implement than known methods, it is quite the opposite. Indeed, the calculation sequences involved by the method advantageously use simpler operations than known methods and require less calculation time.

In particular, an advantage of the method according to the present invention is that the filtering to isolate the spectral components by means of a bidimensional filter, which is real in the frequency field (zero phase) and oriented in the direction of the concentric information requires less calculation than a Gabor filter or than a decomposition in wavelets.

Another advantage of the present invention is that since the used filter is real, it is non phase-shifting. It is thus not necessary to apply two filters in quadrature and a coder. The extraction of the phase and module data is then performed by demodulation, as described previously, directly in an analytic image obtained by a Hilbert transformation. Such a transformation-demodulation sequence is simpler and faster to implement.

A specific advantage of the preferred embodiment of the present invention using Hamming windows is that the used filter has a transfer function in which the most complicated involved mathematical function is a cosine. This filter is thus particularly simpler than a Gabor filter which includes more complicated functions, especially complex exponential functions corresponding to the sum of cosine and sine functions.

Another advantage of a method according to the present invention is the fact that a same number of calculations can provide (upon demodulation) different amounts of information allowing an increased reliability according to the application and the discrimination needs. In other words, the number of discriminating data between two images is independent from the number of calculations performed until demodulation. As compared to the known method using Gabor band-pass filters, this improvement is due to the fact that, according to the present invention, the entire image is processed instead of a reduced number of lines and points. This processing of the entire image is possible without increasing processing times since the implemented processings are more efficient.

Generally, the method according to the present invention applies to the coding of a texture of a ring-shaped element, the texture being characterized by information to be coded which essentially varies according to the angular position in concentric circles.

Such a coding may be used to detect the presence of such a texture. For example, in the woodworking industry, it enables detecting the presence of defects of knot type in the wood in quality control tests. Indeed, if the product, for example, a board, contains no defect, the texture information will be homogeneous. However, in the presence of a defect, a strong variation will be observed in the information.

In the previously-described iris coding application, the obtained code in module, phase, and frequency enables an iridian recognition usable as a recognition parameter to identify an individual. An example of application is the access control: access to a physical site, such as the controlling of the opening of a door with a code, or with an access card; access to a bank account usually protected by a password; access to any device such as a computer or a portable phone usually protected by a code to be typed. Such a device may also replace the fingerprint identification or another biometric identification.

Of course, the present invention is likely to have various alterations, modifications, and improvement which will readily occur to those skilled in the art. In particular, it has been considered in FIG. 3 that the method starts with the acquisition of an eye image. However, the image may come from a database. Further, it has been considered in the foregoing description that the ring-shaped element to be coded had circular internal and external limits. Generally, the limits may be elliptic, provided that the characterizing information remain variable according to the angular direction.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for coding in frequency, module and phase a digital representation, in the space field, of a ring-shaped element, including the steps of:
    applying to any point of the element a polar conversion at constant angle, whereby the element is unfolded in rectangular form;
    transferring, to the frequency field, any point of the converted rectangular shape by means of a Fourier transform;
    filtering the discrete data resulting from the transfer by means of at least one real, bidimensional, band-pass filter, oriented along the phase axis;
    applying a Hilbert transform to the filtering results;
    applying an inverse Fourier transform to the results of the Hilbert transform; and
    extracting phase and module information in the space field.

2. The method of claim 1, wherein the real, bidimensional, band-pass filter oriented along the phase axis is the product of two one-dimensional Hamming windows, the transfer function of each of these windows being zero everywhere, except in a restricted frequency field around a central frequency in which its analytic expression is the following:

$$Y_{i,k}(f_k) = \alpha_{i,k} + (1 - \alpha_{i,k})\cos\frac{\pi(f_k - fq_{i,k})}{f0_{i,k}},$$

where
   i represents the index of the filter in a series of used filters;
   k designates the direction of the considered Hamming window;
   $f_k$ is the current frequency;
   $\alpha_{1,k}$ is a non-zero real positive number strictly smaller than 1;
   $fq_{i,k}$ is the central frequency of the one-dimensional band-pass filter in direction k and of index i in the filter series; and
   $f0_{1,k}$ determines the spectral spreading centered on frequency $fq_{i,k}$.

3. The method of claim 2, wherein the Hamming windows have identical coefficients $\alpha_{1,k}$.

4. The method of claim 3, wherein the Hamming windows are Hanning windows for which the identical coefficients $\alpha_{1,k}$ are 0.54.

5. The method of claim 2, wherein the Hamming windows have different coefficients $\alpha_{1,k}$.

6. The method of claim 1, wherein the real bidimensional band-pass filter oriented along the phase axis has a pass-band at −3 dB with a width of one octave.

7. The method of claim 4, wherein the pass-band of each of the Hamming windows is defined by:

$$f0_{i,k} = \frac{\pi}{3arcos\left(\frac{\frac{1}{2} - \alpha_{i,k}}{1 - \alpha_{i,k}}\right)} fq_{i,k},$$

where arcos designates the inverse cosine function.

8. The method of claim 1, comprising applying three real bidimensional band-pass filters oriented along the axis of the characteristic information of the rectangular image, of different central frequencies.

9. A method for coding, in a digital image, a texture of a ring-shaped element defined by including a first circle of relatively small radius in a second circle of relatively large radius, including implementing the method of claim 1.

10. The method of claim 9, wherein the ring is the iris of an eye, the first circle being the pupil of said eye and the second circle being the limit between the iris and the eye cornea.

* * * * *

UNITED STATES PATENT AND TRADEMARK OFFICE
CERTIFICATE OF CORRECTION

PATENT NO. : 7,031,539 B2
APPLICATION NO. : 10/273792
DATED : April 18, 2006
INVENTOR(S) : Christel-Loïc Tisse and Damien Barbeyrac It is certified that error appears in the above-identified patent and that said Letters Patent is hereby corrected as shown below:

Title Page:
    Item (75) should read:
    (75) Inventors: Christel-Loïc Tisse, Plan de Cuques, (FR)
        Damien Barbeyrac, Luynes (FR)

Col. 3, line 39 should read:
  $\alpha_{i,k}$ is a non-zero real positive number strictly smaller line 43 should read:
$f0_{i,k}$ determines the spectrum spreading centered on fre-line 46 should read:
Hamming windows have identical coefficients $\alpha_{i,k}$.

Col. 4, line 62 should read:
  $Y_{i,2}(f_2)$ $(X_i(f_1,f_2)=Y_{i,1}(f_1).Y_{i,2}(f_2))$, where $f_1$ and $f_2$ desig- Col. 5, line 13 should read:
  $fq_{i,k}+f0_{i,k}$;

line 14 should read:
$\alpha_{i,k}$ is a real non-zero positive number strictly smaller line 16 should read:
$fq_{i,k}$ is the central frequency of the one-dimensional

UNITED STATES PATENT AND TRADEMARK OFFICE
CERTIFICATE OF CORRECTION

PATENT NO. : 7,031,539 B2
APPLICATION NO. : 10/273792
DATED : April 18, 2006
INVENTOR(S) : Christel-Loïc Tisse and Damien Barbeyrac It is certified that error appears in the above-identified patent and that said Letters Patent is hereby corrected as shown below:

Column 5, (continued)

line 19-20 should read:
$f0_{i,k}$ determines the spectral spreading centered on frequency $fq_{i,k}$.

lines 22-24 should read:
$Y_{i,1}$ and $Y_{i,2}$ of the bidimensional filter have identical shape coefficients $\alpha_{i,1}$ and $\alpha_{i,2}$.
Preferbaly, the Hamming windows then are Hanning windows for which shape coefficient $\alpha_{i,k}$ lines 26-28 should read:
As an alternative, the two Hamming windows $Y_{i,1}$ and $Y_{i,2}$ of the bidimensional filters have shape coefficients $\alpha_{i,1}$ and $\alpha_{i,2}$ different from each other.

line 36 should read:
value $f0_{i,k}$ with respect to central frequency $fq_{i,k}$ is the line 49 should read:
several different central frequencies $fq_{i,k}$.

line 66 should read:
each central frequency $fq_{i,k}$, the module, instantaneous Col. 6, line 1 should read:
$a_i(x_0,y_0)$, $\varphi_i(x_0,y_0)$, and $\Delta\varphi_i(x_0,y_0)$ are then extracted, at

UNITED STATES PATENT AND TRADEMARK OFFICE
CERTIFICATE OF CORRECTION

PATENT NO. : 7,031,539 B2
APPLICATION NO. : 10/273792
DATED : April 18, 2006
INVENTOR(S) : Christel-Loïc Tisse and Damien Barbeyrac It is certified that error appears in the above-identified patent and that said Letters Patent is hereby corrected as shown below:

Col. 8, line 12 should read:
$\alpha_{i,k}$ is a non-zero real positive number strictly smaller lines 17 should read:
$f0_{i,k}$ determines the spectral spreading centered on fre lines 20 should read:
have identical coefficients $\alpha_{i,k}$.

line 23 should read:
$\alpha_{i,k}$ are 0.54.

line 25 should read:
have different coefficients $\alpha_{i,k}$.

Signed and Sealed this

Twenty-fifth Day of July, 2006

JON W. DUDAS
*Director of the United States Patent and Trademark Office*